(12) United States Patent
Yang et al.

(10) Patent No.: US 10,841,964 B2
(45) Date of Patent: Nov. 17, 2020

(54) SYSTEMS AND METHODS FOR RAN SLICING IN A WIRELESS ACCESS NETWORK

(71) Applicant: Verizon Patent and Licensing Inc., Arlington, VA (US)

(72) Inventors: Jin Yang, Orinda, CA (US); Arda Aksu, Lafayette, CA (US); Sagiv Draznin, Walnut Creek, CA (US); Lalit R. Kotecha, San Ramon, CA (US); Maria G. Lam, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 38 days.

(21) Appl. No.: 16/201,359

(22) Filed: Nov. 27, 2018

(65) Prior Publication Data
US 2020/0170052 A1 May 28, 2020

(51) Int. Cl.
| | |
|---|---|
| *H04W 76/11* | (2018.01) |
| *H04W 88/08* | (2009.01) |
| *H04W 84/04* | (2009.01) |
| *H04W 28/26* | (2009.01) |
| *H04W 72/04* | (2009.01) |
| *H04W 16/28* | (2009.01) |

(52) U.S. Cl.
CPC .......... *H04W 76/11* (2018.02); *H04W 84/042* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2008/0090575 | A1* | 4/2008 | Barak | H04W 28/18 |
| | | | | 455/444 |
| 2017/0135099 | A1* | 5/2017 | Song | H04W 76/25 |
| 2018/0054765 | A1* | 2/2018 | Kim | H04W 4/70 |
| 2018/0092139 | A1* | 3/2018 | Novlan | H04W 74/0833 |
| 2018/0206152 | A1* | 7/2018 | Zhang | H04W 28/24 |
| 2019/0373487 | A1* | 12/2019 | Harrow | H04W 24/02 |

* cited by examiner

*Primary Examiner* — Jay L Vogel

(57) ABSTRACT

A computer device may include a memory storing instructions and processor configured to execute the instructions to generate a Radio Access Network (RAN) slice in a Fifth Generation (5G) New Radio (NR) base station designated for a particular type of service; determine requirements associated with the generated RAN slice; and reserve resources of the 5G NR base station for the generated RAN slice, wherein reserving the resources includes specifying one or more antenna beams generated by the 5G NR base station. The processor may be further configured to obtain criteria for categorizing user equipment (UE) device sessions as belonging to the generated RAN slice; identify UE device sessions as belonging to the RAN slice based on the obtained criteria; and apply the determined requirements to the identified UE device session using the reserved resources.

20 Claims, 11 Drawing Sheets

800

| RAN SLICE 810 | IMPORTANCE 820 | LATENCY 830 | THROUGHPUT 840 |
|---|---|---|---|
| BACKHAUL BEAM | HIGH | LOW | HIGH |
| MBMS | MEDIUM | MEDIUM | MEDIUM |
| MTC | LOW | HIGH | LOW |
| MOBILE BROADBAND | MEDIUM | VARIABLE | VARIABLE |
| URLLC | HIGH | LOW | MEDIUM |
| EMERGENCY | HIGH | LOW | MEDIUM |

FIG. 8

SYSTEMS AND METHODS FOR RAN SLICING IN A WIRELESS ACCESS NETWORK

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices using different types of services. The services used by the devices may have various types of requirements. Managing all the different service requirements poses various challenges.

BRIEF DESCRIPTION OF THE DRAWINGS

FIG. 8 is a diagram of an exemplary RAN slice table according to an implementation described herein;

DETAILED DESCRIPTION OF PREFERRED EMBODIMENTS

Figure 1:
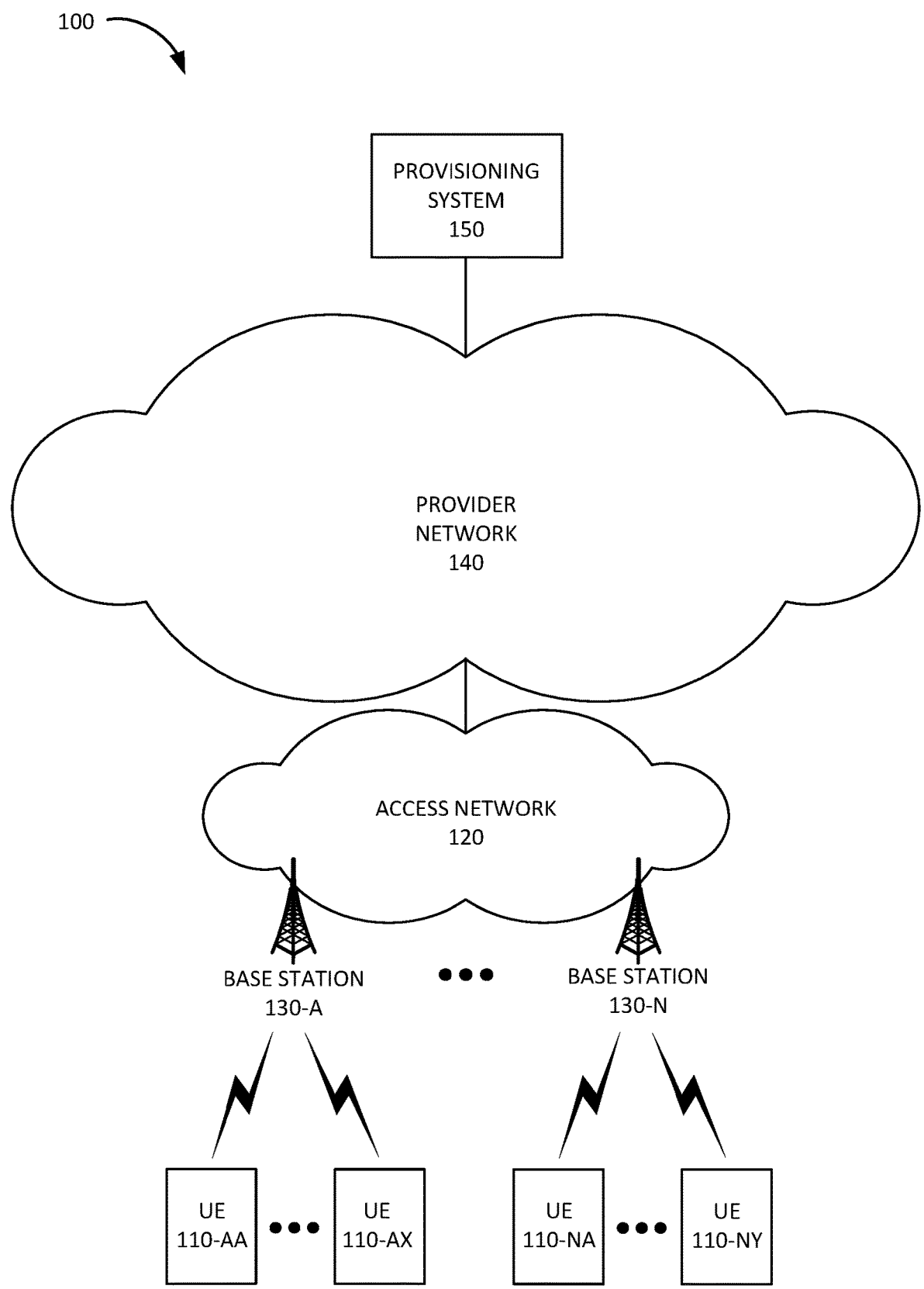
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks have become increasingly more complex. One way in which wireless access networks are continuing to become more complicated is by incorporating various aspects of next generation networks, such as $5^{th}$ generation (5G) mobile networks, utilizing high frequency bands, and/or lower frequency bands such as Sub 6 GHz, and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The antenna arrays may point to multiple users simultaneously using spatial multiplexing and/or beam forming. The use of mm-wave bands and large antenna arrays may require better directional resolution for accurate beam forming. For example, while phased arrays may include a number of predefined antenna array settings that may be selected to perform beam forming, current settings may not be adequate for 5G beam forming. Thus, adaptive antenna arrays that can be adjusted in real time to any available setting (e.g., each antenna element may be individually set to point in a particular direction) may be used. However, determining an optimal antenna array setting may pose significant challenges.

An antenna beam may correspond to radiation pattern focused in a particular direction. An optimum antenna array setting for a particular UE device may form an antenna beam toward the location of the particular UE device in such a way that the particular UE device receives signals at the maximum available signal power and/or quality, while minimizing interference to other UE devices serviced by a base station sector associated with an antenna array wireless transceiver. Thus, if the base station sector services k UE devices, the antenna array may form k simultaneous antenna beams.

5G wireless access networks may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Quality of Service (QoS) class, type of service, and/or particular enterprise customer associated with a set of UE devices.

However, while network slicing enables a provider of communication services to partition network resources into different network slices, the Radio Access Network (RAN), which includes the resources of the base stations that communicate with UE devices using wireless signals, is typically treated as a common resource in existing wireless access networks, such as Fourth Generation (4G) Long Term Evolution (LTE) wireless access networks. Thus, the RAN resources may not be efficiently allocated based on the requirements of various network slices and/or based on the requirements of various network services that may be used by a particular network slice or shared by multiple network slices.

Implementations described herein relate to RAN slicing in a wireless access network. A "RAN slice," as the term is used herein, refers to a logical partition of a 5G NR base station, also referred to as a gNodeB, defined by one or more criteria for classifying a UE device session as belonging to the RAN slice, defined by one or more service requirements for the RAN slice, and associated with a set of resources of the 5G NR base station that are reserved for the RAN slice.

A computer device, associated with a 5G NR base station, may be configured to implement multiple RAN slices. For example, the computer device may be configured to generate a RAN slice in the 5G NR base station, wherein the generated RAN slice is designated for a particular type of service; determine one or more requirements associated with the generated RAN slice; and reserve resources of the 5G NR base station for the generated RAN slice, wherein reserving the resources includes specifying one or more antenna beams generated by the 5G NR base station. The computer device may be further configured to obtain one or more criteria for categorizing UE device sessions as belonging to the generated RAN slice; identify one or more UE device sessions as belonging to the RAN slice based on the obtained one or more criteria; and apply the determined one or more requirements to the identified one or more UE device session using the reserved resources. The computer device may further reserve other resources of the 5G NR base station for another RAN slice that is designated for another type of service.

Reserving the resources of the 5G NR base station may further include reserving time domain and/or frequency domain resources in a 5G NR wireless spectrum associated with the 5G NR base station. As an example, the computer device may reserve a particular band, channel, and/or frequency range of the 5G NR spectrum for the RAN slice. As another example, the computer device may reserve one or more time slots in a rotating sequence of transmitting and/or receiving time slot of the 5G NR spectrum for the RAN slice. Furthermore, the 5G NR base station may partition the resources associated with a particular antenna beam, generated by the 5G NR base station, into multiple RAN slices.

Applying the determined one or more requirements to the identified one or more UE device sessions using the reserved resources may include generating a traffic and/or traffic-aware scheduler for the generated RAN slice and instructing the traffic scheduler to apply the determined one or more requirements to data traffic associated with the generated RAN slice. The one or more requirements may include a latency requirement, a throughput requirement, a priority requirement, and/or another type of requirement. The computer device may further detect requests for a new UE device session, determine that the new UE device session is associated with the generated RAN slice, and establish the new UE device session using the reserved resources.

The RAN slice may be dynamic. For example, the RAN slice may be activated and deactivated based on the conditions of the wireless access network and/or the needs of the provider that manages the wireless access network. For example, the RAN slice may be generated based on a request from a provisioning system, and/or a feedback and analytics system, to generate the RAN slice. The RAN slice may then be activated or deactivated based on requests received from the provisioning system. Additionally or alternatively, the RAN slice may be activated or deactivated based on the conditions of the wireless access network, such as, for example, the number of UE device sessions associated with a particular service, the capacity of the wireless access network, the quality of 5G NR wireless signals associated with the 5G NR base station, and/or other types of conditions.

In some implementations, the RAN slice may include a backhaul antenna beam serving another 5G NR base station. Thus, the other 5G NR base station may function as a UE device with respect to the 5G NR base station and the backhaul antenna beam may function as a backhaul link from the other 5G NR base station to the 5G NR base station. The backhaul antenna beam may be assigned a high priority, a high availability, a low latency, and a high throughput, since the other 5G NR base station may serve a large number of UE devices and the backhaul antenna beam may therefore carry a large amount of traffic.

In some implementations, the RAN slice may include Multimedia Broadcast Multicast Service (MBMS) UE device sessions serviced by the 5G NR base station. Thus, MBMS UE device sessions associated with the 5G NR base station may be assigned to an MBMB RAN slice. Additionally, or alternatively, other RAN slices implemented in the 5G NR base station may include a RAN slice that includes Machine Type Communication (MTC) UE device sessions serviced by the 5G NR base station, a RAN slice that includes Ultra-Reliable Low Latency Communication (URLLC) UE device sessions serviced by the 5G NR base station, a RAN slice that includes emergency call UE device sessions serviced by the 5G NR base station, video call UE device sessions serviced by the 5G NR base station, Mobile Broadband (MBB) UE device sessions serviced by the 5G NR base station, and/or other types of RAN slices.

FIG. 1 is a diagram of an exemplary environment 100 in which the systems and/or methods, described herein, may be implemented. As shown in FIG. 1, environment 100 may include user equipment (UE) devices 110-AA to 110-NY (referred to herein collectively as "UE devices 110" and individually as "UE device 110"), an access network 120, a provider network 140, and a provisioning system 150.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wrist-watch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), a type of M2M communication standardized by the $3^{rd}$ Generation Partnership Project (3GPP), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 120 may provide access to provider network 140 for UE devices 110. Access network 120 may enable UE device 110 to connect to provider network 140 for mobile telephone service, Short Message Service (SMS) message service, Multimedia Message Service (MIMS) message service, Internet access, cloud computing, and/or other types of data services.

Access network 120 may establish or may be incorporated into a packet data network connection between UE device 110 and provider network 140 via one or more Access Point Names (APNs). For example, access network 120 may establish an Internet Protocol (IP) connection between UE device 110 and provider network 140. Furthermore, access network 120 may enable UE device 110 to communicate with an application server, and/or another type of device, located in provider network 140 using a communication method that does not require the establishment of an IP connection between UE device 110 and provider network 140, such as, for example, Data over Non-Access Stratum (DoNAS).

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UE devices 110. For example, base station 130-A may service UE devices 110-AA to 110-AX, etc., to base station 130-N, which may service UE devices 110-NA to 110-NY. In other words, UE devices 110-AA to 110-AX may be located within the geographic area serviced by base station 130-A, and other UE devices 110 may be serviced by another base station 130. Base station 130 may include a 5G base station (e.g., a gNodeB) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UE devices 110, and may simultaneously generate up to k antenna beams. A particular antenna beam may service multiple UE devices 110. In some implementations, base station 130 may also include a 4G base station (e.g., an eNodeB).

Provider network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of provider network 140 may be managed by a provider of communication services that also manages access network 120 and/or UE device 110. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Provisioning system 150 may include one or more devices, such as computer devices and/or server devices, which analyze and provision services in access network 120 and/or provider network 140. Provisioning system 150 may configure particular network devices for particular services and/or may generate instructions to dispatch a technician to configure a particular service. For example, provisioning system 150 may provision a particular base station 130 to implement a particular RAN slice.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
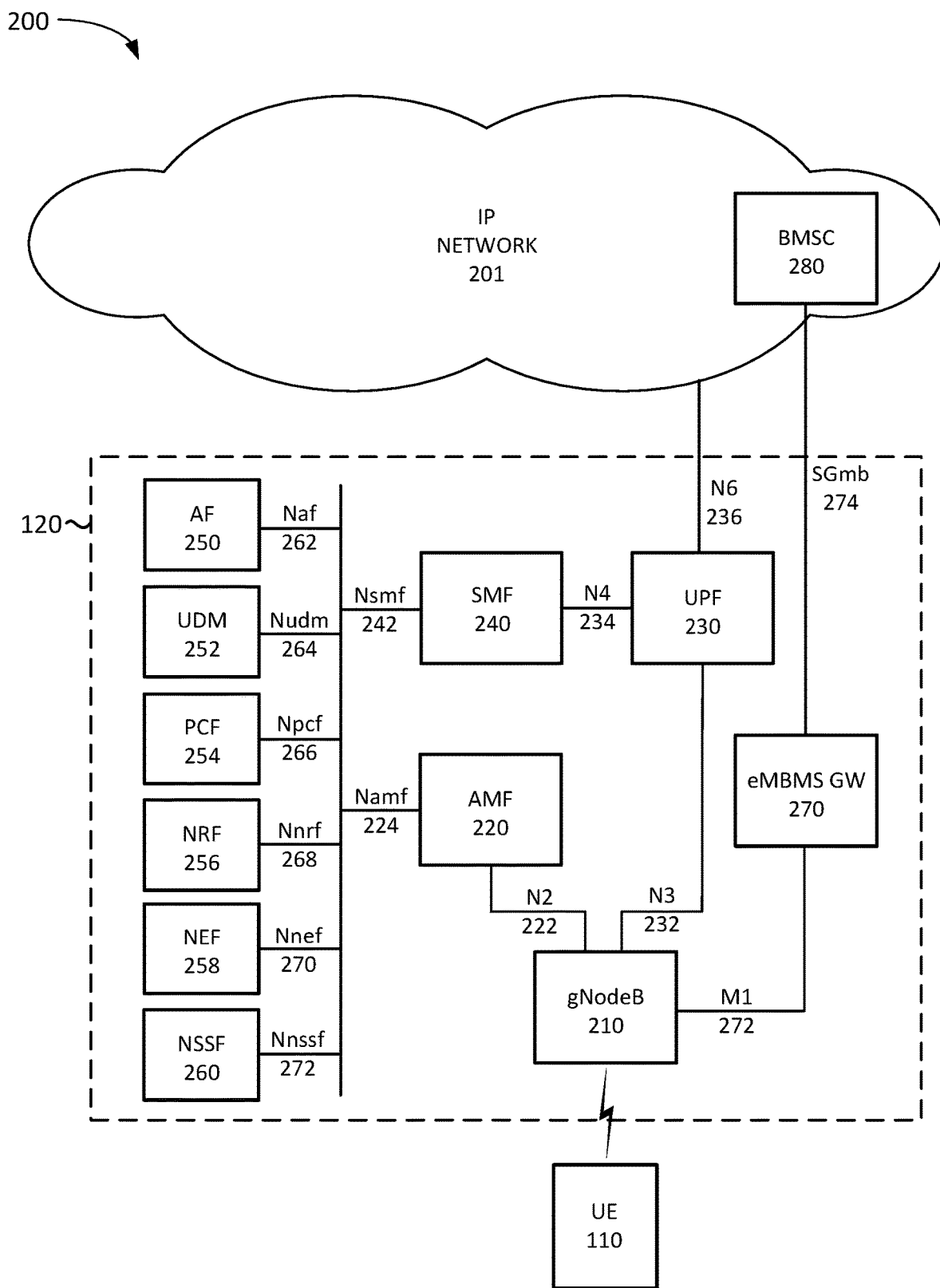
FIG. 2 is a diagram illustrating exemplary components of the access network of FIG. 1 according to an implementation described herein.

FIG. 2 is a diagram illustrating a system 200 that includes exemplary components of access network 120 in the context of environment 100 according to an implementation described herein. As shown in FIG. 2, system 200 may include UE device 110, access network 120, and an IP network 201. IP network 201 may correspond to, or be included in, provider network 140.

Access network 120 may include a gNodeB 210 (corresponding to base station 130), an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, a Network Slice Selection Function (NSSF) 260, and an enhanced MBMS gateway (eMBMS GW) 270.

IP network 201 may include a Broadcast/Multicast Service Center (BMSC) 280. While FIG. 2 depicts a single gNodeB 210, AMF 220, UPF 230, SMF 240, AF 250, UDM 252, PCF 254, NRF 256, NEF 258, NSSF 260, eMBMS GW 270, and/or BMSC 280 for illustration purposes, in practice, FIG. 2 may include multiple gNodeBs 210, AMFs 220, UPFs 230, SMFs 240, AFs 250, UDMs 252, PCFs 254, NRFs 256, NEFs 258, NSSFs 260, eMBMS GWs 270, and/or BMSCs 280.

gNodeB 210 may include one or more devices (e.g., base stations) and other components and functionality that enable UE device 110 to wirelessly connect to access network 120 using 5G NR Radio Access Technology (RAT). For example, gNodeB 210 may include one or more cells, with each cell including a wireless transceiver with an antenna array configured for mm-wave wireless communication. gNodeB 210 may implement one or more RAN slices. gNodeB 210 may communicate with AMF 220 using an N2 interface 222 and communicate with UPF 230 using an N3 interface 232.

AMF 220 may perform registration management, connection management, reachability management, mobility management, lawful intercepts, Short Message Service (SMS) transport between UE device 110 and an SMS function (not shown in FIG. 2), session management messages transport between UE device 110 and SMF 240, access authentication and authorization, location services management, functionality to support non-3GPP access networks, and/or other types of management processes. In some implementations, AMF 220 may implement some or all of the functionality of managing RAN slices in gNodeB 210. AMF 220 may be accessible by other function nodes via an Namf interface 224.

UPF 230 may maintain an anchor point for intra/inter-RAT mobility, maintain an external Packet Data Unit (PDU) point of interconnect to a data network (e.g., IP network 201, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., gNodeB 210), and/or perform other types of user plane processes. UPF 230 may communicate with SMF 240 using an N4 interface 234 and connect to IP network 201 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate of charging data collection, termination of session management parts of NAS messages, perform downlink data notification, manage roaming functionality, and/or perform other types of control plane processes for managing user plane data. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including $3^{rd}$ party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

NSSF 260 may select a set of network slice instances to serve a particular UE device 110, determine network slice selection assistance information (NSSAI), determine a particular AMF 220 to serve a particular UE device 110, and/or perform other types of processes associated with network slice selection or management. In some implementations, NSSF 260 may implement some or all of the functionality of managing RAN slices in gNodeB 210. NSSF 260 may be accessible via Nnssf interface 272.

BMSC 280 may receive content intended for multicast/broadcast distribution from a content provider (not shown in FIG. 2) and may add application layer forward error correction (FEC) to add redundancy to the content. BMSC 280 may forward the content to eMBMS GW 270. Furthermore, BMSC 280 may support file repair and/or file retrieval via unicast if a particular UE device 110 does not receive a complete file during a multicast transmission. BMSC 280 may communicate with eMBMS GW 270 via SGmb interface 274.

eMBMS GW 270 may deliver a same file, such as multicast video, and/or other types of files, to a large number of UE devices 110 within a particular service area. In some implementations, the content provider may provide a file to BMSC 280, for example as an over-the-air (OTA) file. The OTA file may be sent as a one-time delivery or as a carousel delivery (e.g., repeated transmissions) to ensure all UE devices 110 receive the OTA file. Once a file delivery is complete, eMBMS GW 270 may provide the functionality for UE device 110 to repair the received file via unicast if any symbols were lost during transmission.

eMBMS GW 270 may serve as a gateway between an IP network and the RAN associated with gNodeB 210. If multiple gNodeBs 210 are involved in the distribution of content, eMBMS GW 270 may forward the multicast/broadcast content to all gNodeBs 210 participating in the content distribution. eMBMS GW 270 may communicate with gNodeB 210 through an M1 interface 272. M1 interface 272 may be implemented, for example, using MBMS Synchronization Protocol (SYNC). In some implementations, eMBMS GW 270 may be implemented in UPF 230. In other implementations, eMBMS GW 270 may be implemented in a device separate and/or different from UPF 230.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120. For example, access network 120 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 2, additionally or alternatively, access network 120 may include a reference point architecture that includes point-to-point interfaces between particular function nodes.

Figure 3:
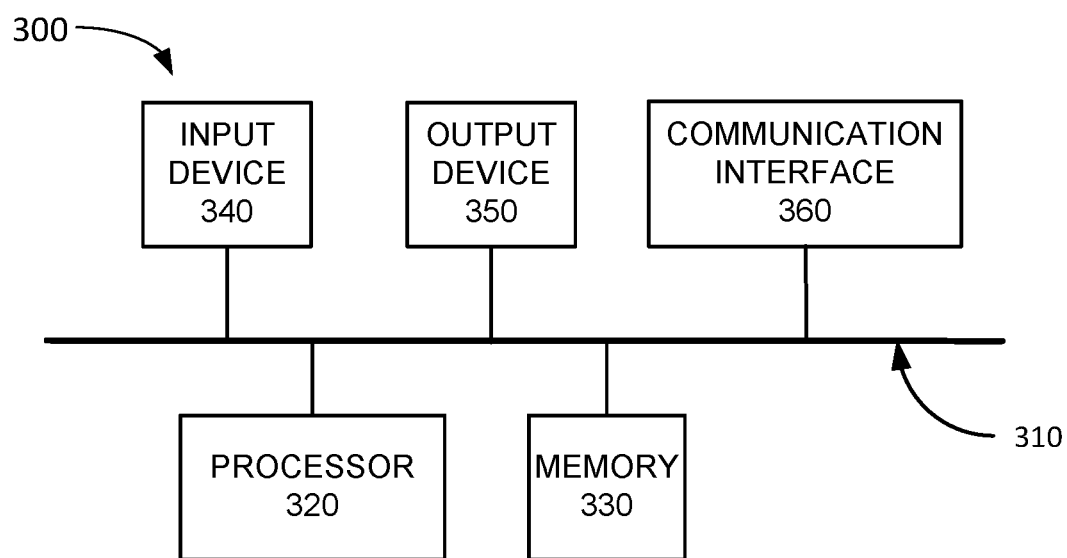
FIG. 3 is a diagram illustrating exemplary components of a device that may be included in a component of FIG. 1 or FIG. 2 according to an implementation described herein.

FIG. 3 is a diagram illustrating example components of a device 300 according to an implementation described herein. UE device 110, gNodeB 210, AMF 220, UPF 230, SMF 240, AF 250, UDM 252, PCF 254, NRF 256, NEF 258, NSSF 260, other components of access network 120, and/or provisioning system 150 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to generating, managing, applying, activating, deactivating, and/or otherwise processing RAN slices. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
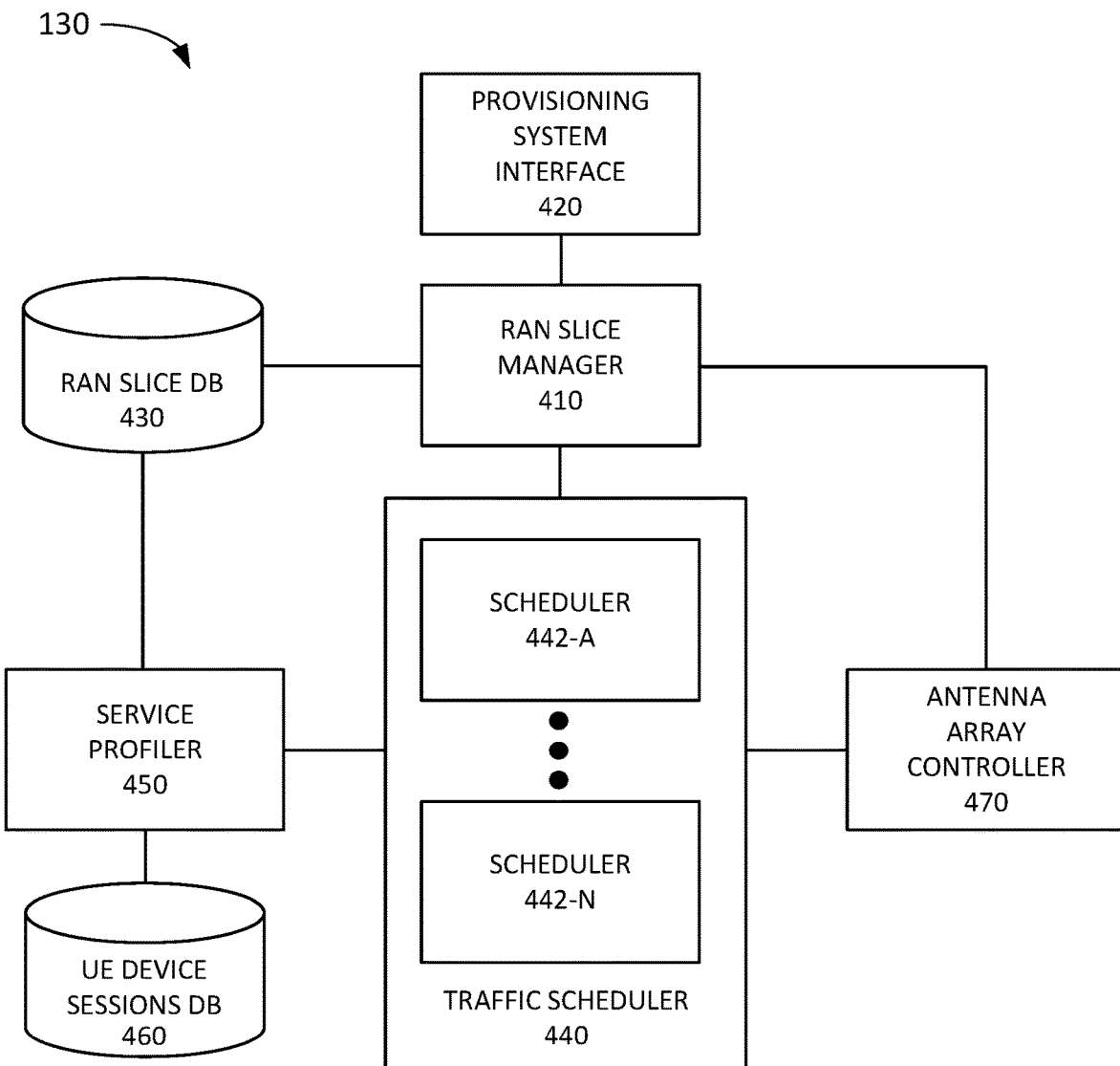
FIG. 4 is a diagram illustrating exemplary functional components of the base station of FIG. 1 according to an implementation described herein.

FIG. 4 is a diagram illustrating exemplary functional components of base station 130. The functional components of base station 130 may be implemented, for example, via processor 320 executing instructions from memory 330. Alternatively, some or all of the functional components of base station 130 may be implemented via hard-wired circuitry. As shown in FIG. 4, base station 130 may include a RAN slice manager 410, a provisioning system interface 420, a RAN slice database (DB) 430, a traffic scheduler 440, a service profiler 450, a UE device sessions DB 460, and an antenna array controller 470.

RAN slice manager 410 may manage RAN slices in gNodeB 210. Provisioning system interface 420 may be configured to communicate with provisioning system 150. For example, RAN slice manager 410 may receive instructions from provisioning system 150, relating to provisioning of RAN slices, via provisioning system interface 420. RAN slice manager 410 may generate a new RAN slice in response receive an instruction from provisioning system 150 to generate a new RAN slice.

RAN slice manager 410 may determine one or more criteria for UE device sessions as belonging to the generated RAN slice based on parameters associated with UE device sessions and may determine one or more requirements associated with the generated RAN slice. Furthermore, RAN slice manager 410 may reserve resources associated with gNodeB 210 for the generated RAN slice. The reserved resources may include particular time slots in a 5G NR wireless signal transmission and/or reception schedule, particular bands, channels, and/or frequency ranges in the 5G NR wireless spectrum associated with gNodeB 210, and/or particular antenna beams and/or portions of antenna beams associated with a 5G NR antenna array of gNodeB 210.

RAN slice manager 410 may store information relating to the generated new RAN slice in RAN slice DB 430. RAN slice DB 430 may store information relating to particular RAN slices implemented in gNodeB 210. Exemplary information that may be stored in RAN slice DB 430 is described below with reference to FIG. 5.

Furthermore, RAN slice manager 410 may dynamically activate or deactivate RAN slices based on instructions received from provisioning system 150 and/or based on particular network conditions. As an example, provisioning system 150 may instruct RAN slice manager 410 to deactivate a particular RAN slice during a particular time period. As another example, RAN slice manager 410 may be configured to deactivate a particular RAN slice based on detecting a particular condition associated with access network 120 such as, for example, the number of UE device sessions using a service associated with the particular RAN slice, the capacity of access network 120, the RF conditions associated with an antenna beam assigned to the particular RAN slice, and/or another type of network condition.

Traffic scheduler 440 may schedule traffic to be transmitted by a 5G NR antenna array associated with gNodeB 210. For example, traffic scheduler 440 may assign queued data units associated with particular UE device sessions to particular scheduled time slots on particular channels and/or particular antenna beams and may provide the queued data units to antenna array controller 470 for transmission based on the assigned time slots. Antenna array controller 470 may control an antenna array, associated with gNodeB 210, to generate one or more antenna beams pointing in particular directions. Furthermore, traffic scheduler 440 may receive input from a service profiler to adjust and optimize resources based on preset criteria.

In some implementations, traffic scheduler 440 may include multiple independent schedulers 442-A to 442-N (referred to herein collectively as "schedulers 442" and individually as "scheduler 442"). Each scheduler 442 may be associated with a particular RAN slice and may schedule traffic associated with UE device sessions that have been classified or assigned to the particular RAN slice. Each scheduler 442 may be associated with a particular subset of the resources of gNodeB 210 and may schedule traffic using the associated resources. The subset of resources may include particular time slots, particular frequency ranges, and/or particular antenna beams.

Service profiler 450 may classify UE device session into particular RAN slices. For example, service profiler 450 may intercept traffic associated with a particular UE device session and may classify the UE device session into a particular RAN slice based on the criteria associated with the RAN slice. For example, service profiler 450 may determine whether traffic associated with a UE device session is being sent or received via another gNodeB 210; a type of UE device 110, a type of wireless connection being used by the UE device session; a type of bearer, session, and/or QoS class being used by the UE device session; and/or another type of parameter associated with the UE device session. Service profiler 450 may then assign the UE device session to a particular RAN slice. Furthermore, service profile 450 may store information relating to the UE device session in service profiler 450.

Service profiler 450 may store information associated with particular UE device sessions in UE device sessions DB 460. UE device sessions DB 460 may store information relating to particular UE device sessions, such as, for example, an identifier (ID) associated with a particular UE device session, a particular UE device 110 associated with the particular UE device session, a particular type of UE device 110 associated with the particular UE device session, whether traffic is being sent to the particular UE device 110 via a backhaul beam to another gNodeB 210, a type of wireless connection associated with the particular UE device 110, a type of bearer associated with the particular UE device 110, a QoS class associated with the particular UE device 110, one or more service requirements associated with the particular UE device session, and/or other types of information associated with the particular UE device session.

Although FIG. 4 shows exemplary functional components of base station 130, in other implementations, base station 130 may include fewer functional components, different functional components, differently arranged functional components, or additional functional components than depicted in FIG. 4. Additionally, or alternatively, one or more functional components of base station 130 may perform functions described as being performed by one or more other functional components of base station 130. For example, some or all of the functionality described with respect to FIG. 4 may be implemented by another component of access network 120, such as, for example, AMF 220 and/or NSSF 260.

Figure 5:
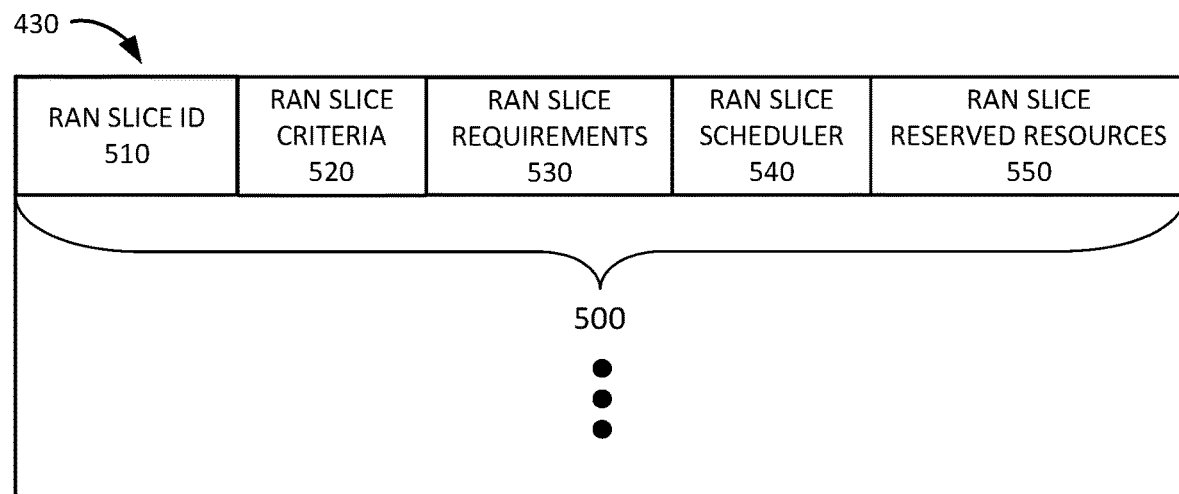
FIG. 5 is a diagram illustrating exemplary components of the Radio Access Network (RAN) slice database of FIG. 4 according to an implementation described herein.

FIG. 5 is a diagram illustrating exemplary information stored in RAN slice DB 430 according to an implementation described herein. As shown in FIG. 5, RAN slice DB 430 may include one or more RAN slice records 500. Each RAN slice record 500 may store information relating to a particular RAN slice. RAN slice record 500 may include a RAN slice ID field 510, a RAN slice criteria field 520, a RAN slice requirements field 530, a RAN slice scheduler field 540, and a RAN slice reserved resources field 550.

RAN slice ID field 510 may store information identifying a particular RAN slice, such as a name and/or description associated with the particular RAN slice. RAN slice criteria field 520 may store information identifying one or more criteria for classifying a UE device session as belonging to the particular RAN slice. For example, RAN slice criteria field 520 may identify whether the particular UE device session should be associated with a backhaul beam, whether the particular UE device session should be associated with a particular type of UE device 110, a particular type of wireless connection, a particular type of bearer, particular QoS class, a particular set of service requirements, and/or other types of criteria associated with the particular RAN slice.

RAN slice requirements field 530 may store information identifying the service requirements associated with the particular RAN slice. For example, RAN slice requirements field 530 may store information identifying an importance and/or priority assigned to the particular RAN slice, a latency requirement associated with the particular RAN slice, a throughput requirement associated with the particular RAN slice, an availability and/or capacity requirement associated with the particular RAN slice, and/or other types of service requirements.

RAN slice scheduler field 540 may identify a particular scheduler 442 associated with the particular RAN slice. RAN slice reserved resources field 550 may store information identifying the reserved resources associated with the particular RAN slice. For example, RAN slice reserved resources field 550 may store information identifying one or more time slots assigned to the particular RAN slice, one or more frequency bands, channels, and/or ranges assigned to the particular RAN slice, one or more antenna beams or portions of antenna beams assigned to the particular RAN slice, memory and/or storage resources assigned to the particular RAN slice, processor resources assigned to the particular RAN slice, and/or other types of reserved resources assigned to the particular RAN slice.

Although FIG. 5 shows exemplary components of RAN slice DB 430, in other implementations, RAN slice DB 430 may include fewer components, different components, additional components, or differently arranged components than depicted in FIG. 5.

Figure 6:
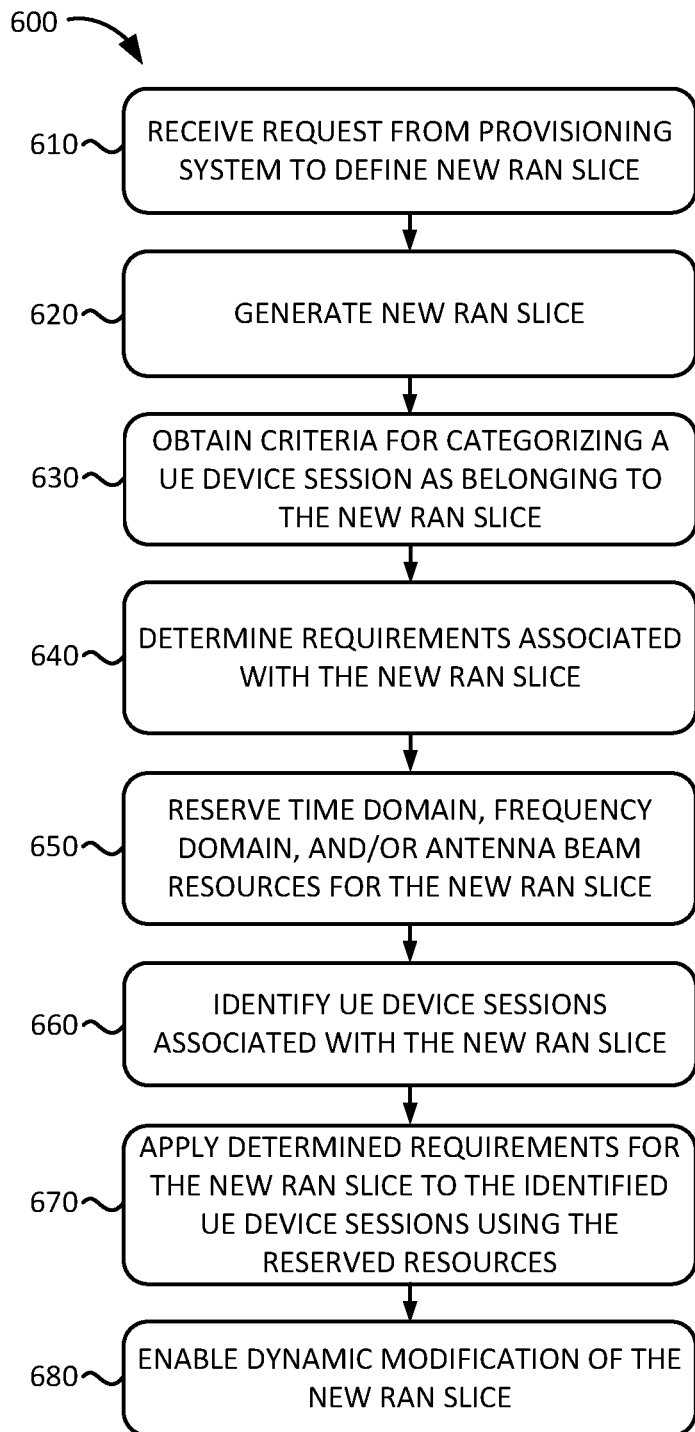
FIG. 6 is a flowchart of a process for implementing RAN slicing according to an implementation described herein.

FIG. 6 is a flowchart of a process for implementing RAN slicing according to an implementation described herein. In some implementations, the process of FIG. 6 may be performed by gNodeB 210. In other implementations, some or all of the process of FIG. 6 may be performed by another device or a group of devices separate from gNodeB 210, such as, for example, AMF 220 and/or NSSF 260.

The process of FIG. 6 may include receiving a request from provisioning system 150 (block 610) and generating a new RAN slice in response to the request (block 620). For example, RAN slice manager 410 may receive instructions from provisioning system 150, via provisioning system interface 420, to generate a new RAN slice in gNodeB 210. RAN slice manager 410 may generate a new RAN slice in response receive an instruction from provisioning system 150 and may create a new RAN slice record 500 in RAN slice DB 430.

Criteria for categorizing a UE device session as belonging to the new RAN slice may be obtained (block 630). For example, RAN slice manager 410 may determine one or more criteria for UE device sessions as belonging to the generated RAN slice. The criteria may be received from provisioning system 150. Additionally, or alternatively, RAN slice manager 410 may determine the criteria based on information received from provisioning system 150. The criteria may include, for example, information identifying one or more parameters associated with a UE device session, such as whether packets, or other types of data units associated with a UE device session are being sent or received via another gNodeB 210, a type of wireless connection being used by the UE device session (e.g., whether the UE device session is associated with an NB-IoT connection, a Cat-M1 connection, etc.), a type of bearer, session, and/or QoS class being used by the UE device session (e.g., an MBMS session, a URLLC session, a video calling QoS class, etc.), and/or another type of parameter associated with the UE device session.

Requirements associated with the new RAN slice may be determined (block 640). For example, RAN slice manager 410 may obtain, from provisioning system 150, and/or another component of access network 120, requirements associated with the new RAN slice, such as, for example, latency requirements and throughput requirements associated with a particular bearer type and/or QoS class associated with the new RAN slice. Furthermore, provisioning system 150 may assign a particular importance, priority, and/or availability requirement to the new RAN slice and RAN slice manager 410 may store the assigned importance, priority, and/or availability requirement in RAN slice record 500 associated with the new RAN slice.

Time domain, frequency domain, and/or antenna beam resources may be reserved for the new RAN slice (block 650). For example, RAN slice manager 410 may reserve one or more time slots in a transmission schedule for the new RAN slice, may reserve one or more frequency bands, channels, and/or ranges for the new RAN slice, and/or may reserve one or more antenna beams or portions of antenna beams for the new RAN slice. The particular resources that are reserved, and the amount of the available resources that are reserved may depend on the type of RAN slice and/or an importance or priority assigned to the new RAN slice.

For example, if the priority and/or importance of the new RAN slice is high, RAN slice manager 410 may assign a large time slot (e.g., longer duration), or a large number of time slots, to the new RAN slice. As an example, if the new RAN slice corresponds to a backhaul beam, then a backhaul beam to another gNodeB 210 may be reserved for the backhaul beam RAN slice. Furthermore, since the backhaul beam may carry a large amount of traffic, the backhaul beam RAN slice may be assigned a high importance and RAN slice manager 410 may reserve a large number of time slots and/or may assign a large number of channels to the backhaul beam in comparison to other types of UE device sessions assigned to a RAN slice with a lower importance or priority.

As another example, if the new RAN slice corresponds to an MBMS RAN slice, the RAN slice may be associated with a higher throughput requirement and a large number of UE device sessions and a large number of antenna beams to UE devices 110 associated with UE devices 110 that subscribed to receive MBMS content from a particular content provider. Thus, RAN slice manager 410 may associate the antenna beams with the MBMS RAN slice and may reserve time slots and channels to enable gNodeB 210 to transmit the MBMS content to the subscribed UE devices 110 during a scheduled broadcast.

As yet another example, if the new RAN slice corresponds to an URLLC RAN slice, the RAN slice may be associated with a very low latency. However, the throughput requirements may not be particularly high, as URLLC messages may not include a large amount of data. Thus, RAN slice manager 410 may reserve a large number of time slots of short duration distributed among time slots assigned to other RAN slices, in order to satisfy the very low latency requirement. As yet another example, if the new RAN slice corresponds to an MTC RAN slice, the RAN slice may be associated with particular 5G NR channels assigned to MTC communication, such as, for example, 1.4 MHz wide eMTC channels dedicated to Cat-M1 UE device sessions and/or NB-IoT channels dedicated to NB-IoT UE device sessions.

UE device sessions associated with the new RAN slice may be identified (block 660) and the determined requirements for the new RAN slice may be applied to the identified UE device sessions using the reserved resources (block 670). For example, service profiler 450 may classify the active UE device sessions into the new RAN slice if the parameters associated with the active UE device sessions and the criteria associated with the new RAN slice identified in RAN slice DB 430 match.

Dynamic modification of the new RAN slice may be enabled (block 680). The reserved resources assigned to the RAN slice may be changed dynamically. For example, antenna beams assigned to the RAN slice may be changed based on which UE devices 110 are associated with UE device sessions classified in the RAN slice and/or based on the locations of the UE devices 110. Furthermore, the RAN slice may then be activated or deactivated based on requests received from provisioning system 150 and/or based on the conditions of the wireless access network 120, such as, for example, the number of UE device sessions associated with a particular service, the capacity of the wireless access network, the quality of 5G NR wireless signals associated with gNodeB 210, and/or other types of conditions.

Figure 7:
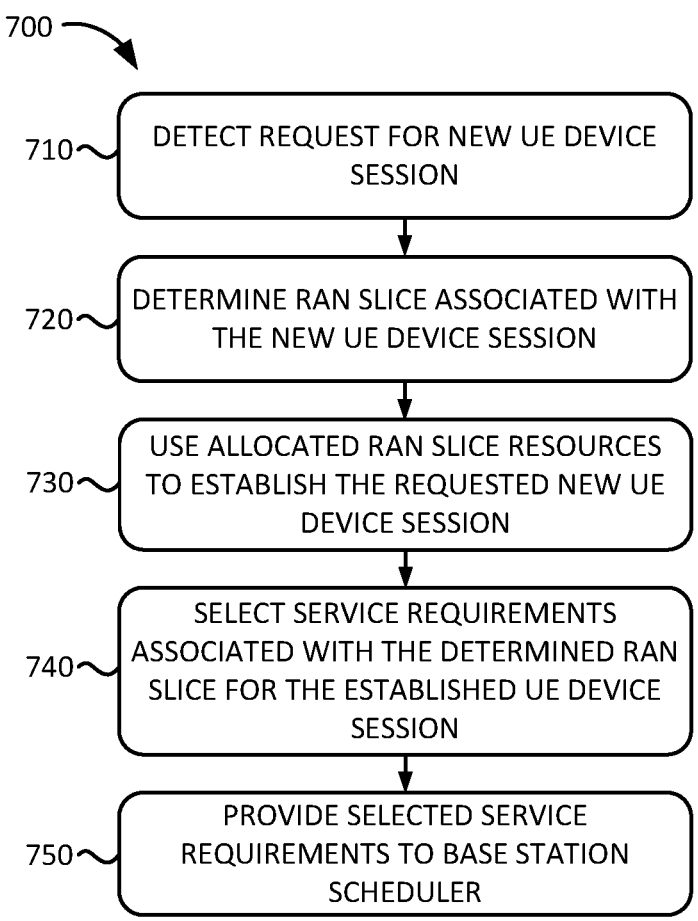
FIG. 7 is a flowchart of a process for managing a user equipment (UE) device session according to an implementation described herein.

FIG. 7 is a flowchart of a process for managing a user equipment (UE) device session according to an implementation described herein. In some implementations, the process of FIG. 7 may be performed by gNodeB 210. In other implementations, some or all of the process of FIG. 7 may be performed by another device or a group of devices separate from gNodeB 210.

The process of FIG. 7 may include detecting a request for a new UE device session (block 710) and determining a RAN slice associated with the detected new UE device session (block 720). For example, UE device 110 may request a UE device session of a particular type and service profiler 450 may detect the request and classify the requested UE device session into a particular RAN slice based on the parameters associated with the requested UE device session and the criteria associated with the RAN slices implemented in gNodeB 210 and identified in RAN slice DB 430.

The allocated RAN slice resources may be used to establish the requested new UE device session (block 730). For example, service profiler 450 may assign the new UE device session to a particular scheduler 442 associated with the RAN slice into which the new UE device session was classified. Service requirements associated with the determined RAN slice may be selected for the established UE device session (block 740) and the selected service requirements may be provided to the base station scheduler (block 750). For example, the particular scheduler 442 may schedule transmission of data units associated with the UE device session using the resources reserved for the RAN slice, associated with the particular scheduler 442, based on the requirements, such as the latency and throughput requirements, associated with the RAN slice.

FIG. 8 is a diagram of an exemplary RAN slice table 800 according to an implementation described herein. As shown in FIG. 8, RAN slice table 800 may include a RAN slice column 810, an importance column 820, a latency column 830, and a throughput column 840. RAN slice column 810 may include entries identifying RAN slices implemented in gNodeB 210. For example, RAN slice column 810 may include a backhaul beam RAN slice, an MBMS RAN slice, an MTC RAN slice, an MBB RAN slice, a URLLC RAN slice, and an emergency RAN slice.

The backhaul beam RAN slice may include UE device sessions associated with a backhaul beam to another gNodeB 210. As shown in RAN slice table 800, the backhaul beam RAN slice may be associated with a high importance requirement, a low latency requirement, and a high throughput requirement. The MBMS RAN slice may include MBMS UE device sessions serviced by the 5G NR base station. As shown in RAN slice table 800, the MBMS RAN slice may be associated with a medium importance requirement, a medium latency requirement, and a medium throughput requirement. The MTC RAN slice may include MTC UE device sessions serviced by the 5G NR base station. As shown in RAN slice table 800, the MTC RAN slice may be associated with a low importance requirement, a high latency requirement, and a low throughput requirement.

The MBB RAN slice may include MBB UE device sessions serviced by the 5G NR base station. As shown in RAN slice table 800, the MBB RAN slice may be associated with a medium importance requirement, a variable latency requirement, and a variable throughput requirement. The latency and throughput requirements for the MBB RAN slice may depend, for example, on QoS classes associated with particular MBB UE device sessions. The URLLC RAN slice may include URLLC UE device sessions serviced by the 5G NR base station. As shown in RAN slice table 800, the URLLC RAN slice may be associated with a high importance requirement, a low latency requirement, and a medium throughput requirement. The emergency RAN slice may include emergency call UE device sessions serviced by the 5G NR base station. As shown in RAN slice table 800, the emergency RAN slice may be associated with a high importance requirement, a low latency requirement, and a medium throughput requirement.

Even though RAN slice table 800 illustrates various RAN slice requirements as high, medium, or low for illustrative purposes, in practice, RAN slice table 800 may include particular numerical values for particular requirements. For example, an importance requirement may include a numerical rank indicating the importance of a particular RAN slice among all the implemented RAN slices, a latency requirement may include a latency requirement specified in milliseconds (ms), and a throughput requirement may include a throughput requirement specified in bits per second (bit/s or bps). Furthermore, RAN slice table 800 may include fewer, additional, and/or different requirements.

Figure 9:
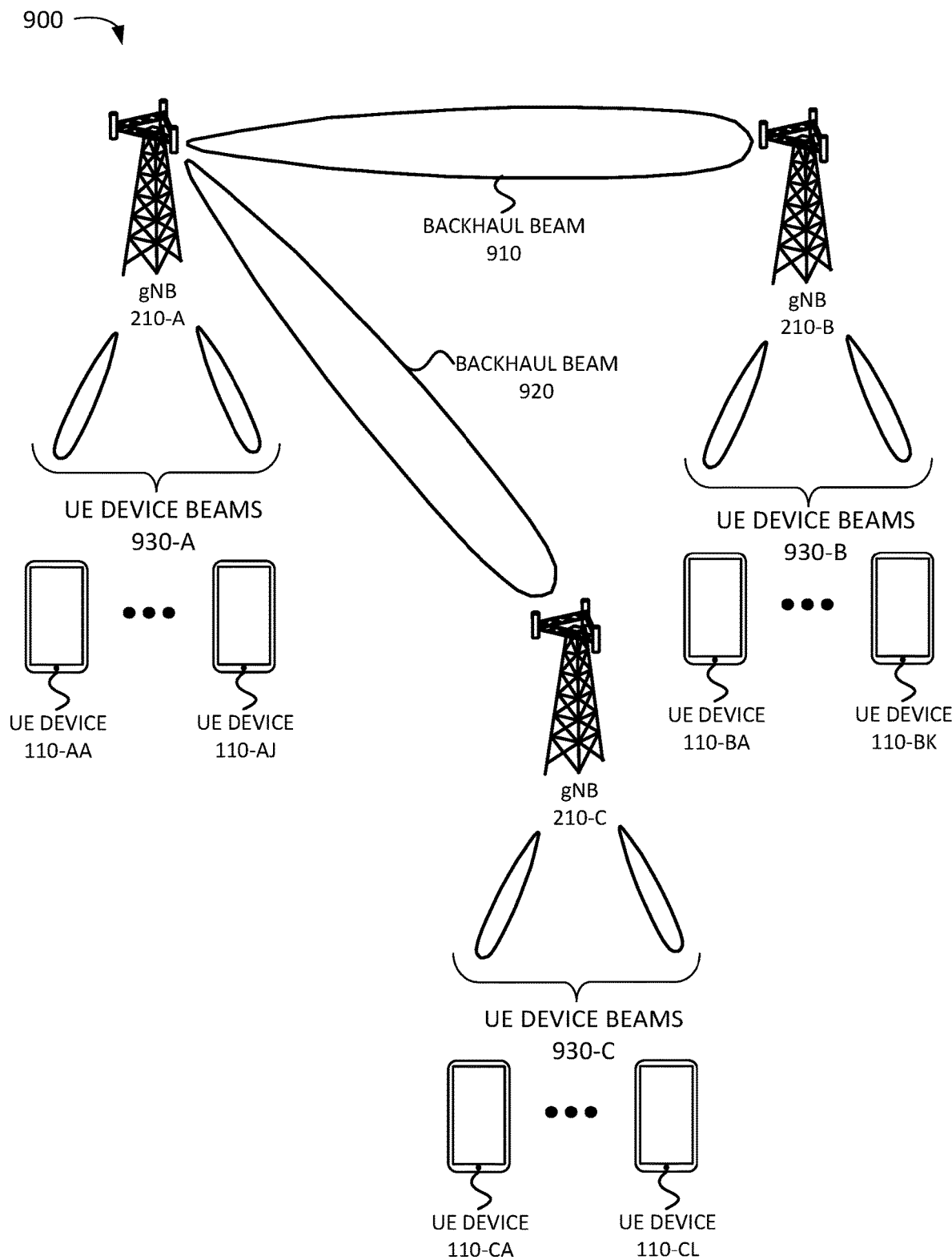
FIG. 9 is a diagram illustrating an exemplary backhaul beam RAN slice according to an implementation described herein.

FIG. 9 is a diagram illustrating a system 900 that includes exemplary backhaul beam RAN slices according to an implementation described herein. As shown in FIG. 9, system 900 may include gNodeB (gNB) 210-A serving UE devices 110-AA to 110-AJ via antenna beams 930-A, gNodeB 210-B serving UE devices 110-BA to 110-BK via antenna beams 930-B, and gNodeB 210-C serving UE devices 110-CA to 110-CL via antenna beams 930-C. Furthermore, gNodeB 210-A may serve gNodeB 210-B via backhaul beam 910 and serve gNodeB 210-C via backhaul beam 920. Thus, all UE device traffic to and from UE devices 110-BA to 110-BK may be transmitted through gNodeB 210-B to gNodeB 210-A via backhaul beam 910.

gNodeB 110-B may thus function as a relay and/or access point for UE devices 110-BA to 110-BK and may function as a UE device with respect to gNodeB 110-A. Similarly, all UE device traffic to and from UE devices 110-CA to 110-CL may be transmitted through gNodeB 210-C to gNodeB 210-A via backhaul beam 920 and gNodeB 110-C may function as a relay and/or access point for UE devices 110-CA to 110-CL and may function as a UE device with respect to gNodeB 110-A.

gNodeB 110-A may generate a first backhaul beam RAN slice for backhaul beam 910 and a second backhaul beam RAN slice for backhaul beam 920. Thus, backhaul beams 910 and 920 may be assigned a higher priority for scheduling traffic than UE device beams 930-A associated with UE devices 110-AA to 110-AJ. Furthermore, backhaul beams 910 and 920 my be assigned a low latency requirement and a high throughput requirement that gNodeB 910-A needs to satisfy when scheduling traffic via backhaul beams 910 and 920.

Figure 10:
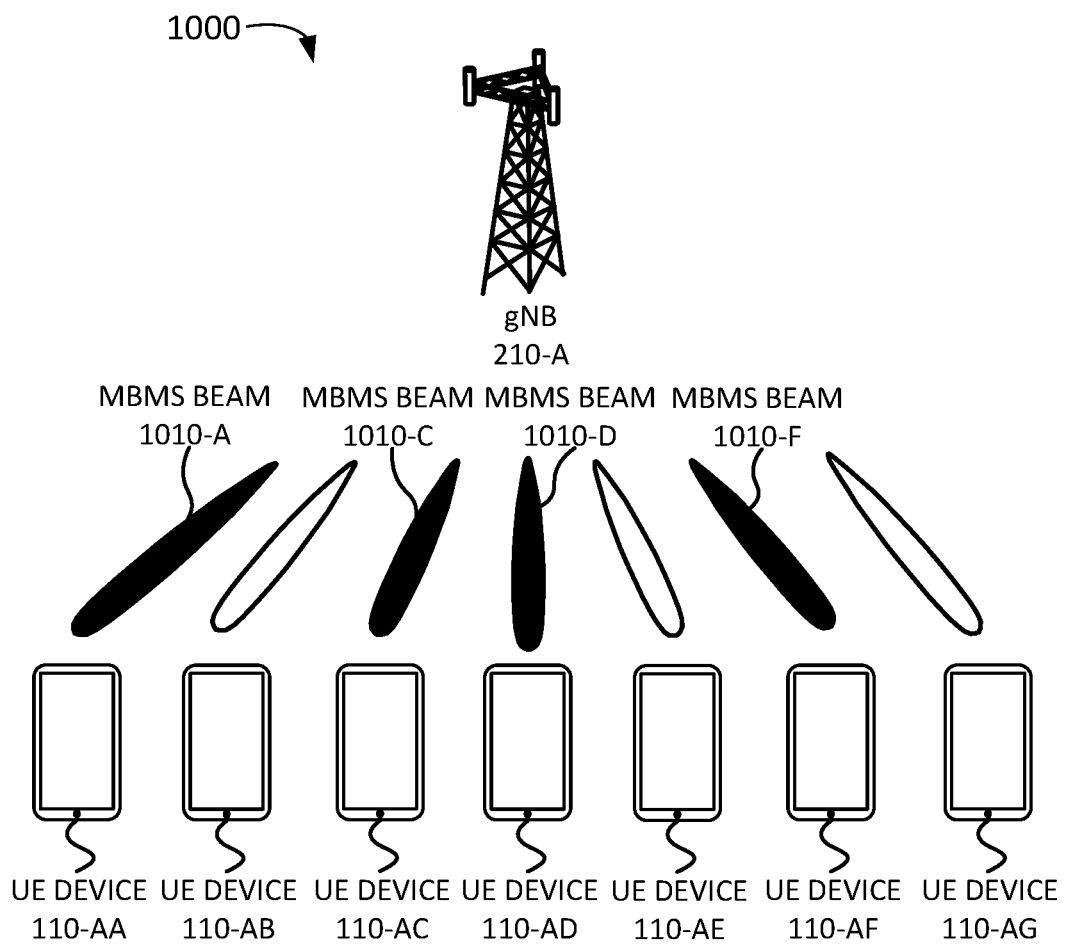
FIG. 10 is a diagram illustrating an exemplary multicast RAN slice according to an implementation described herein.

FIG. 10 is a diagram illustrating a system 1000 that includes an exemplary MBMS RAN slice according to an implementation described herein. As shown in FIG. 10, system 1000 may include gNodeB 210-A that services UE devices 110-AA, 110-AB, 110-AC, 110-AD, 110-AE, 110-AF, and 110-AG via antenna beams 1010. Assume UE devices 110-AA, 110-AC, 110-AD, and 110-AF have subscribed to MBMS content that is to be broadcast at a particular time. In response, antenna beam 1010-A to UE device 110-AA, antenna beam 1010-C to UE device 110-AC, antenna beam 1010-D to UE device 110-AD, and antenna beam 1010-F to UE device 110-AF may be included in the MBMS RAN slice as MBMS antenna beams. In response, MBMS antenna beams 1010-A, 1010-C, 1010-D, and 1010-F may be assigned a particular priority, latency requirement, and/or throughput requirement associated with the MBMS service (e.g., a medium latency requirement and a medium throughput requirement).

Figure 11:
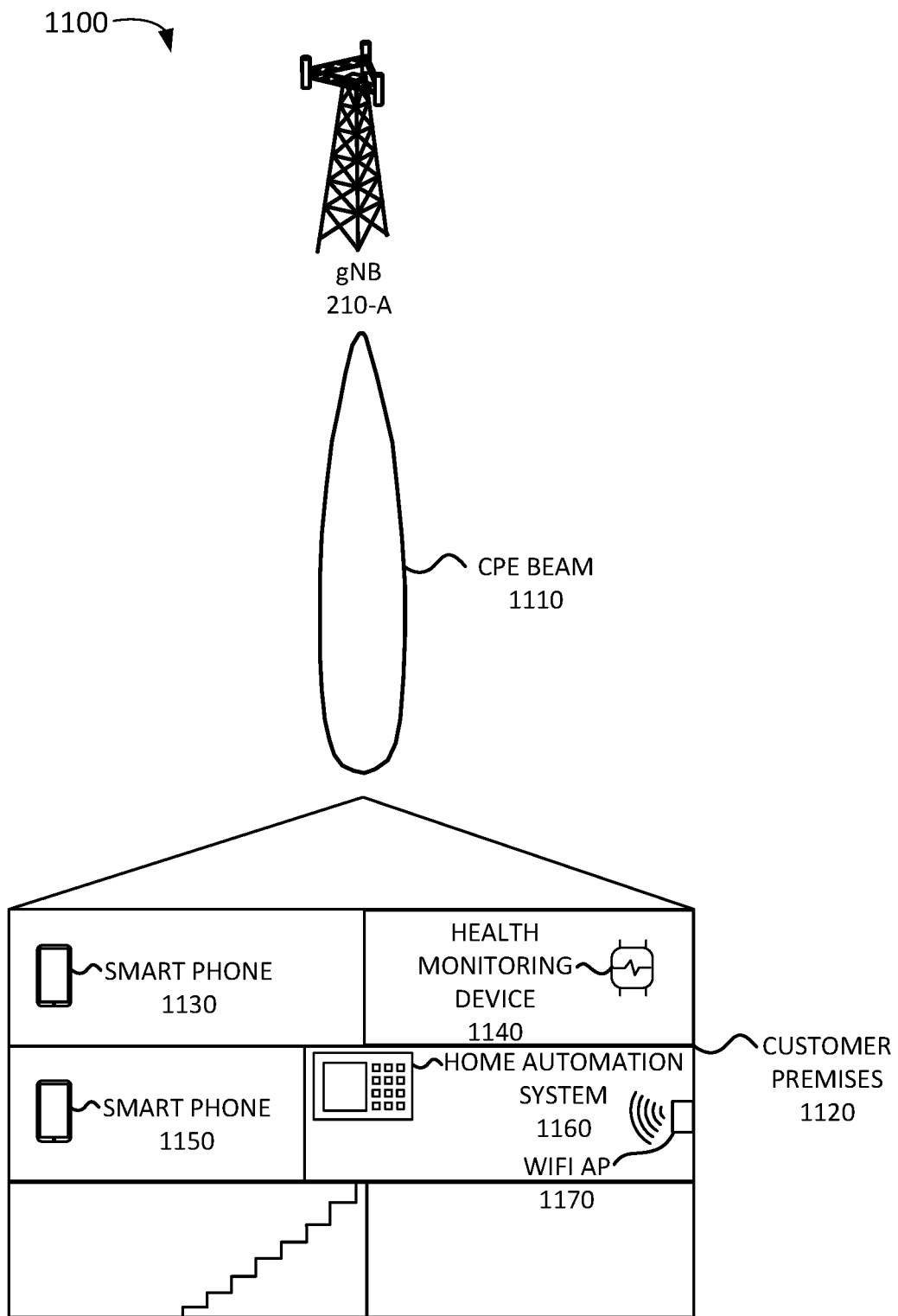
FIG. 11 is a diagram illustrating different RAN slices in an antenna beam according to an implementation described herein.

FIG. 11 is a diagram illustrating a system 1100 that includes different RAN slices in an antenna beam according to an implementation described herein. As shown in FIG. 11, system 1100 may include gNodeB 210-A serving a customer premises 1120 via a customer premises equipment (CPE) antenna beam 1110. Customer premises 1120 may include various UE devices 110 associated with different RAN slices implemented in gNodeB 210-A.

For example, customer premises 1120 may include a first smart phone 1130, a health monitoring device 1140, a second smart phone 1150, a home automation system 1160, and a WiFi access point (AP) 1170. First smart phone 1130, second smart phone 1150, and WiFi AP 1170 may be assigned to an MBB RAN slice implemented in gNodeB 210-A. Health monitoring device 1140 may be assigned to an URLLC RAN slice implemented in gNodeB 210-A. Home automation system 1160 may be assigned to an MTC RAN slice implemented in gNodeB 210-A. Thus, a particular antenna beam may be partitioned into different RAN slices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
generating, by a computer device, a plurality of Radio Access Network (RAN) slices in a base station, wherein a generated RAN slice of the generated plurality of RAN slices is designated for a particular type of service, and wherein the generated RAN slice includes a backhaul beam RAN slice for an antenna beam acting as a backhaul link for another base station;
determining, by the computer device, one or more requirements associated with the generated RAN slice, wherein the one or more requirements include at least one of a latency requirement or a throughput requirement;
reserving, by the computer device, resources of the base station for the generated RAN slice, wherein reserving the resources includes specifying the antenna beam;
obtaining, by the computer device, one or more criteria for categorizing user equipment (UE) device sessions as belonging to the generated RAN slice, wherein the one or more criteria include identifying whether a UE device session is to be associated with a backhaul beam;
detecting, by the computer device, a request for a UE device session;
establishing, by the computer device, the UE device session based on the request;
identifying, by the computer device, the UE device session as belonging to the generated RAN slice based on the obtained one or more criteria; and
applying, by the computer device, the determined one or more requirements to the identified UE device session using the reserved resources.

2. The method of claim 1, further comprising:
reserving other resources of the base station for another RAN slice of the plurality of RAN slices, wherein the other RAN slice is designated for another type of service.

3. The method of claim 1, wherein reserving resources of the base station for the generated RAN slice further includes:
reserving at least one of time domain resources or frequency domain resources in a 5G NR wireless spectrum associated with the base station.

4. The method of claim 1, wherein applying the determined one or more requirements to the identified UE device session using the reserved resources includes:
generating a traffic scheduler for the generated RAN slice; and
using the traffic scheduler to apply the determined one or more requirements to data traffic associated with the generated RAN slice.

5. The method of claim 1, further comprising:
receiving a request from a provisioning system to generate the RAN slice in the base station.

6. The method of claim 1, further comprising:
deactivating the generated RAN slice based on receiving an instruction from a provisioning system or based on detecting a particular network condition associated with the base station.

7. The method of claim 1, further comprising:
partitioning resources associated with another antenna beam generated by the base station into multiple RAN slices of the plurality of RAN slices.

8. The method of claim 1, further comprising:
assigning a priority value to the backhaul beam RAN slice, wherein the assigned priority value is higher than priority values assigned to other ones of the plurality of RAN slices.

9. The method of claim 1, wherein the plurality of RAN slices further includes a Multimedia Broadcast Multicast Service (MBMS) RAN slice.

10. The method of claim 1, wherein the plurality of RAN slices further includes a Machine Type Communication (MTC) RAN slice.

11. The method of claim 1, wherein the plurality of RAN slices further includes a Low Latency Communication RAN slice.

12. A computer device comprising:
a memory storing instructions; and
processor configured to execute the instructions to:
generate a plurality of Radio Access Network (RAN) slices in a base station, wherein a generated RAN slice of the generated plurality of RAN slices is designated for a particular type of service, and wherein the generated RAN slice includes a backhaul beam RAN slice for an antenna beam acting as a backhaul link for another base station;
determine one or more requirements associated with the generated RAN slice, wherein the one or more requirements include at least one of a latency requirement or a throughput requirement;
reserve resources of the base station for the generated RAN slice, wherein reserving the resources includes specifying the antenna beam;
obtain one or more criteria for categorizing user equipment (UE) device sessions as belonging to the generated RAN slice, wherein the one or more criteria include identifying whether a UE device session is to be associated with a backhaul beam;
detect a request for a UE device session;
establish the UE device session based on the request;
identify the UE device session as belonging to the RAN slice based on the obtained one or more criteria; and
apply the determined one or more requirements to the identified UE device session using the reserved resources.

13. The computer device of claim 12, wherein the processor is further configured to:
reserve other resources of the base station for another RAN slice of the plurality of RAN slices, wherein the other RAN slice is designated for another type of service.

14. The computer device of claim 12, wherein, when applying the determined one or more requirements to the identified UE device session using the reserved resources, the processor is further configured to:
generate a traffic scheduler for the generated RAN slice; and
use the traffic scheduler to apply the determined one or more requirements to data traffic associated with the generated RAN slice.

15. The computer device of claim 12, wherein the processor is further configured to:
deactivate the generated RAN slice based on receiving an instruction from a provisioning system or based on detecting a particular network condition associated with the base station.

16. The computer device of claim 12, wherein the processor is further configured to:
  partition resources associated with another antenna beam generated by the base station into multiple RAN slices of the plurality of RAN slices.

17. The computer device of claim 12, wherein the plurality of RAN slices further includes at least one of:
  a Multimedia Broadcast Multicast Service (MBMS) RAN slice;
  a Machine Type Communication (MTC) RAN slice; or
  a Low Latency Communication RAN slice.

18. A system comprising:
  a base station comprising:
    an antenna array configured to generate a plurality of antenna beams; and
    a computer device configured to:
      generate a plurality of Radio Access Network (RAN) slices in the base station, wherein a generated RAN slice of the generated plurality of RAN slices is designated for a particular type of service, and wherein the generated RAN slice includes a backhaul beam RAN slice for an antenna beam, of the plurality of antenna beams, acting as a backhaul link for another base station;
      determine one or more requirements associated with the generated RAN slice, wherein the one or more requirements include at least one of a latency requirement or a throughput requirement;
      reserve resources of the base station for the generated RAN slice, wherein reserving the resources includes specifying the antenna beam;
      obtain one or more criteria for categorizing user equipment (UE) device sessions as belonging to the generated RAN slice, wherein the one or more criteria include identifying whether a UE device session is to be associated with a backhaul beam;
      detect a request for a UE device session;
      establish the UE device session based on the request;
      identify the UE device session as belonging to the RAN slice based on the obtained one or more criteria; and
      apply the determined one or more requirements to the identified UE device session using the reserved resources.

19. The system of claim 18, wherein, when applying the determined one or more requirements to the identified UE device session using the reserved resources, the computer device is further configured to:
  generate a traffic scheduler for the generated RAN slice; and
  use the traffic scheduler to apply the determined one or more requirements to data traffic associated with the generated RAN slice.

20. The system of claim 18, wherein the computer device is further configured to:
  deactivate the generated RAN slice based on receiving an instruction from a provisioning system or based on detecting a particular network condition associated with the base station.

* * * * *